Patented Jan. 14, 1936

2,027,897

UNITED STATES PATENT OFFICE 2,027,897

AZO-DYESTUFF

Gérald Bonhôte, Basel, Switzerland, assignor to the firm Society of Chemical Industry in Basle, Basel, Switzerland No Drawing. Application May 9, 1935, Serial No. 20,679. In Switzerland May 19, 1934

6 Claims. (Cl. 260—95)

This invention relates to dyestuffs which are characterized by the brilliancy of their dyeings and by their otherwise valuable dyeing properties, by coupling a diazo-compound derived from an amine of the general formula

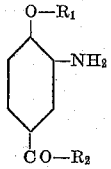

wherein $R_1$ stands for an aryl radical of the benzene series and $R_2$ for an alkyl radical, with an arylide of 2,3-hydroxynaphthoic acid.

The new dyestuffs correspond therefore to the general formula

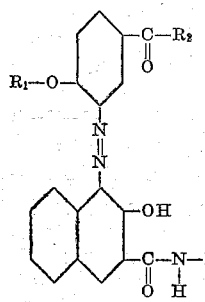

in which $R_1$ and $R_2$ have the signification indicated above, and $R_3$ represents an aromatic nucleus of the benzene or naphthalene series. They form red powders insoluble in water, dissolving in organic solvents, such as pyridine, to red-orange solutions, and when produced on the fiber dye the same vivid scarlet to blue-red tints which are characterized by excellent fastness properties to light and bleaching. As for the fiber on which the new dyestuffs can be produced, there may be named cotton above all. The dyestuffs can however also be produced on regenerated cellulose, such as viscose artificial silk, on cellulose esters, such as acetate artificial silk, on natural silk or on wool. Further, they may also find application as pigments, for example for dyeing lacquers or varnishes.

Among these dyestuffs those are particularly valuable in which the radical $R_1$ may stand for an aryl nucleus of the benzene series capable of being substituted, the radical $R_2$ for an alkyl radical consisting of not too great a number of carbon atoms, for example one or two carbon atoms, and the radical $R_3$ for an aromatic nucleus of the benzene series. Among these dyestuffs those are again particularly valuable in which the benzene nucleus $R_3$ contains at least one alkoxy-group, i. e. dyestuffs of the general formula

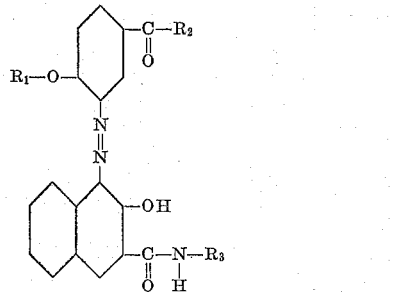

in which $R_1$ and $R_2$ have the meaning indicated above and in which $R_3$ stands for an aryl radical of the benzene series substituted in ortho- or para-position to the

by an alkoxy-group.

The ketones of the general formula

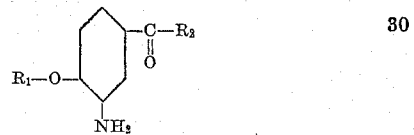

necessary for producing the new dyestuffs can be obtained quite generally by condensing with bromobenzene, carboxylic acid chlorides, such as acetyl chloride, propionyl chloride, butyryl chloride and the like, nitrating the ketone thus formed in ortho-position to the bromine atom, causing the bromine atom to react with a phenol, such as phenol, para-cresol, ortho-cresol, meta-cresol, para-chlorophenol and the like, and reducing the nitrated ethers thus obtainable.

The following examples illustrate the invention, the parts being by weight:—

Example 1

22.7 parts of 2-amino-4-acetyl-1,1'-diphenyl-ether are diazotized in the usual manner. The clear diazo-solution is introduced into a solution consisting of 31.1 parts of 2,3-hydroxynaphthoic acid-5'-chloro-2'-methylanilide, 60 parts of sodium hydroxide solution of 30 per cent. strength, 15 parts of sodium carbonate and 2000 parts of water. The dyestuff thus formed of the formula

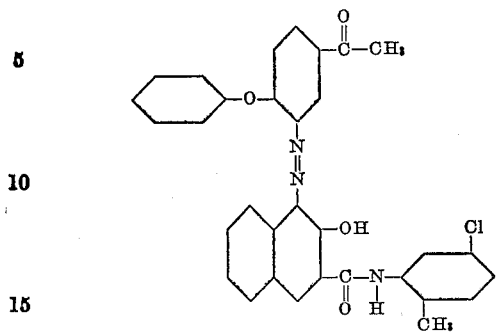

is immediately precipitated. The red precipitate is filtered and dried. The procedure is similar for example with the 2-amino-4-propionyl-1, 1'-diphenylether or with the 2,3-hydroxynaphthoic acid-2', 4'-dimethoxy- or -2', 4'-diethoxyanilide.

*Example 2*

Cotton yarn is impregnated with a grounding made by dissolving 7 grams of 2,3-hydroxynaphthoic acid -2'-methylanilide in 300 cc. of hot water with addition of 12 cc. of caustic soda solution of 30 per cent. strength and 10 cc. of Turkey red oil and diluting the whole to 1 litre. The goods are then wrung out and developed in a diazo-solution, buffered with sodium acetate and containing per litre the diazo-compound corresponding with 2 grams of 2-amino-4-acetyl-4'-chloro-1,1'-diphenylether. There is produced a pure red of excellent properties of fastness. The formula of the new dyestuff is

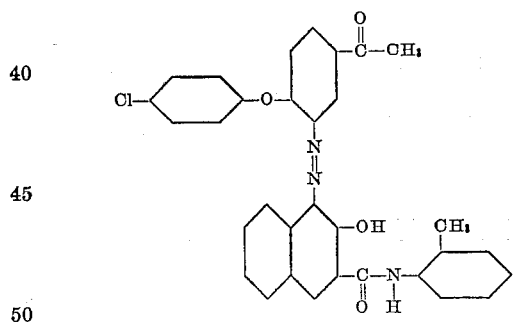

Similar red tints are obtained when there is used 2,5-dimethoxy-anilide, 2,4-dimethoxy-5-chloranilide, 2-methyl-4-methoxy-anilide, 3,4-dichloranilide, 5-chloro-2-methyl-anilide, or 4-chloro-2-methoxyanilide of 2,3-hydroxynaphthoic acid.

Scarlet red tints are obtained with the meta-toluidide, meta-chloranilide, ortho-phenetidide, ortho-toluidide, 2- methoxy -5- methylanilide, para-chloranilide, β-naphthalide, ortho-anisidide, para-toluidide or para-phenetidide of 2,3-hydroxynaphthoic acid.

*Example 3*

Cotton yarn is impregnated with a solution containing per litre 5.5 grams of 2,3-hydroxynaphthoic acid-4'-methoxyanilide, 12 cc. of sodium hydroxide solution of 30 per cent. strength, 10 cc. of Turkey red oil, 6 cc. of formaldehyde solution of 40 per cent. strength, then well wrung out and developed in a diazo-solution buffered with sodium acetate and containing per litre, the diazo-compound from 2 grams of 2-amino-4-acetyl-4'-methyl-1,1'-diphenylether; rinsing and soaping follow. There is obtained a very pure red tint of very good properties of fastness. The formula of the new dyestuff is

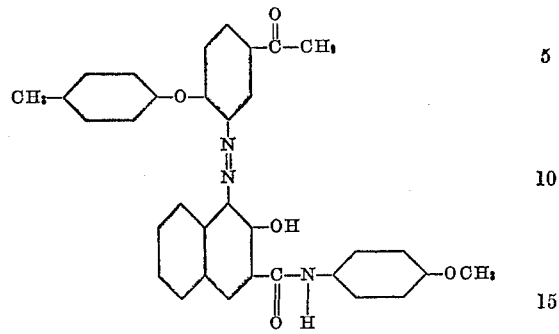

Similar red tints are obtained with the para-chloranilide, the meta-nitranilide, the 2-methyl-4-methoxylanilide or the α-naphthalide of 2,3-hydroxynaphthoic acid.

Scarlet red tints are obtained with the ortho-anisidide, the para-toluidide or the para-phenetidide of 2,3-hydroxynaphthoic acid.

If in this example there is substituted for the base to be diazotized therein named the 2-amino-4-acetyl-3'-methyl-1,1'-diphenylether, there are obtained with the aforesaid coupling components fast scarlet red tints.

Similar results attend the dyeing of piece-goods or printing.

What I claim is:—

1. The dyestuffs of the general formula

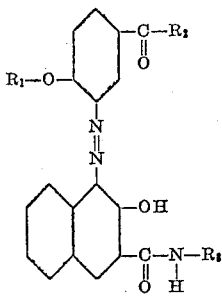

in which $R_1$ stands for an aryl radical of the benzene series, $R_2$ for an alkyl radical consisting of not more than two carbon atoms, and $R^3$ for a radical of the benzene or naphthalene series, which dyestuffs are red powders insoluble in water, but dissolving in pyridine to red-orange solutions, and which dyestuffs when prepared on the fiber, dye the same fast vivid scarlet to red tints.

2. The dyestuffs of the general formula

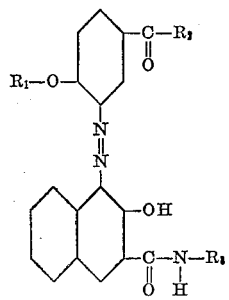

in which $R_1$ stands for an aryl radical of the benzene series, $R_2$ for an alkyl radical consisting of not more than two carbon atoms, and in which $R_3$ stands for an aryl nucleus of the benzene series substituted in ortho- or para-position to the NH-group by an alkoxy-group, which products are red powders insoluble in water, but dissolving in pyridine to red-orange solutions, and which dyestuffs when prepared on the fiber, dye the same fast vivid scarlet to red tints.

3. The dyestuffs of the general formula

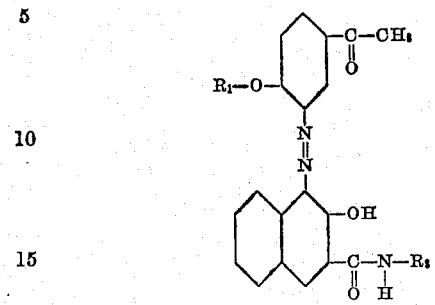

in which $R_1$ stands for aryl radical of the benzene series, and in which $R_3$ stands for an aryl nucleus of the benzene series substituted in ortho- or para-position to the NH-group by an alkoxy-group which products are red powders insoluble in water, but dissolving in pyridine to red-orange solutions, and which dyestuffs when prepared on the fiber, dye the same fast vivid scarlet to red tints.

4. The dyestuff of the formula

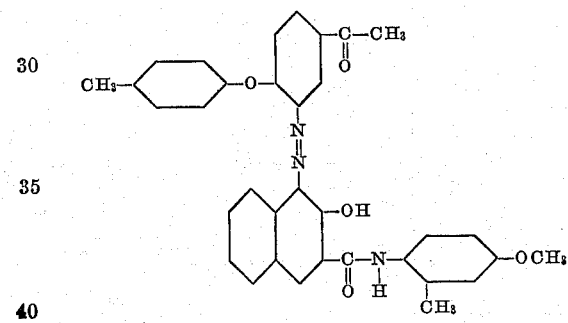

which dyestuff is a red powder insoluble in water, but dissolving in pyridine to a red-orange solution, and which dyestuff, when produced on cotton, dyes this fiber fast red tints.

5. The dyestuff of the formula

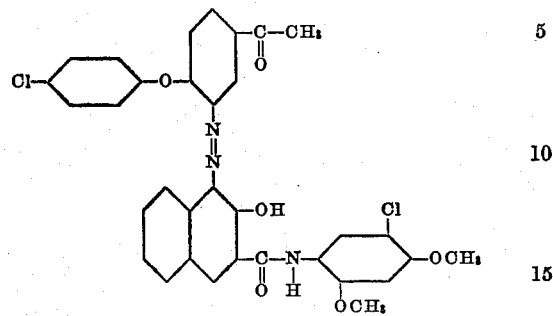

which dyestuff is a red powder insoluble in water, but dissolving in pyridine to a red-orange solution, and which dyestuff, when produced on cotton, dyes this fiber fast red tints.

6. The dyestuff of the formula

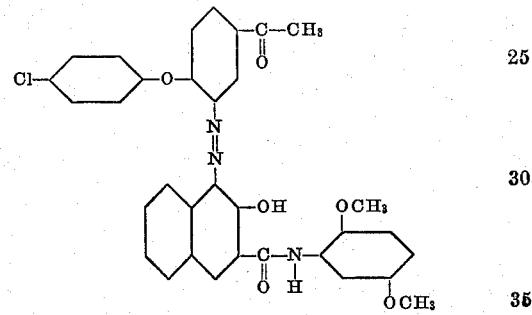

which dyestuff is a red powder insoluble in water, but dissolving in pyridine to a red-orange solution, and which dyestuff, when produced on cotton, dyes this fiber fast red tints.

GÉRALD BONHÔTE.